Figure 1:
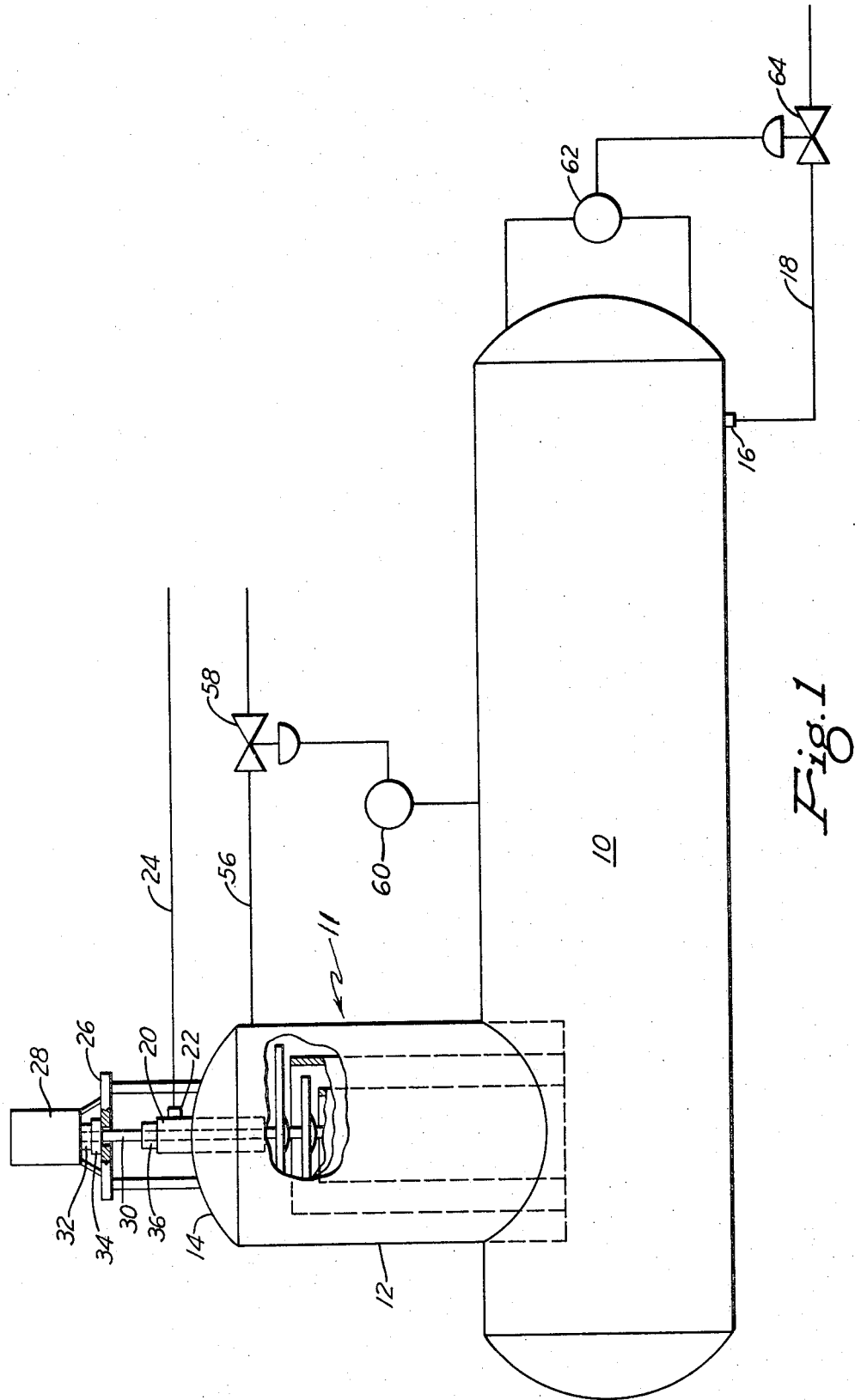

United States Patent [19]
Whitaker

[11] 3,807,712
[45] Apr. 30, 1974

[54] WATER AERATION EQUIPMENT

[75] Inventor: Norman R. Whitaker, Port Arthur, Tex.

[73] Assignee: Gulf Oil Corporation, Pittsburgh, Pa.

[22] Filed: Jan. 5, 1973

[21] Appl. No.: 321,516

[52] U.S. Cl. .................................................. 261/89
[51] Int. Cl............................................ B01f 3/04
[58] Field of Search ...................................... 261/89

[56] References Cited
UNITED STATES PATENTS

| | | | |
|---|---|---|---|
| 610,946 | 9/1898 | Niebling................................ | 261/89 |
| 928,118 | 7/1909 | Fowler et al.......................... | 261/89 |
| 1,081,241 | 12/1913 | Lymn.................................... | 261/89 |
| 2,048,888 | 7/1936 | Ott......................................... | 261/89 |
| 2,166,772 | 7/1939 | Salsas-Serra.......................... | 261/28 |
| 2,811,258 | 10/1957 | Schleyer et al. ....................... | 261/89 |

Primary Examiner—Tim R. Miles

[57] ABSTRACT

A horizontal cylindrical soaker tank has a vertical cylindrical contactor extending upwardly from it. Within the contactor are a plurality of vertically spaced horizontal discs mounted on a vertical rotating shaft. Surrounding each disc and adapted to intercept water discharged from the edge of the disc is a vertical sleeve. Water delivered onto each disc is either discharged from the outer edge of the disc against the shell sleeve or falls through openings in the disc to a lower disc. Water flowing down the surfaces of the shell and sleeves is contacted by air delivered under pressure into the contactor. Water draining from the sleeves into the soaker is held under pressure in the soaker to give additional time for absorption of air.

5 Claims, 2 Drawing Figures

WATER AERATION EQUIPMENT

This invention relates to the aeration of water and more particularly to compact apparatus for obtaining intimate contact between water and air under pressure to increase the oxygen concentration in the water.

Many industrial and other uses of water either reduce the oxygen concentration in the water or introduce into the water constituents which will, over a period of time, consume oxygen in the water and thereby reduce the oxygen concentration. One measure of the quality of water is the biochemical oxygen demand of the water, ordinarily referred to as the BOD. The BOD indicates the oxygen requirements of polluted waters and is determined by measurement of the reduction of oxygen concentration of the water when the water is subjected to certain defined conditions over a standard period of time. If the BOD is too high the water won't support fish life.

One method of reducing the BOD of water before it is discharged into streams is to pass the water through a spray pond where the water is sprayed into the air and falls back into the pond. The sprays are operated continuously and are of a capacity such that the water may be recirculated a number of times through the sprays before it is discharged from the spray pond. The low solubility of oxygen in water causes the rate of oxygen absorption to be low and makes necessary spray ponds of substantial volume and area. Frequently, space for a spray pond is not available.

Another method for contacting water with air is to discharge the water at high velocities against a stationary wall whereby the water is broken into small droplets which fall through a stream of air. One type of such apparatus is disclosed in U.S. Pat. No. 2,166,772 of Salsas-Serrs. Such apparatus is designed primarily for the evaporation of a liquid into a gas stream rather than absorption of the gas by the liquid. Another type of apparatus employing a plurality of horizontal discs mounted on a rotating shaft is described in U.S. Pat. No. 610,946 of Niebling.

This invention resides in apparatus for aerating water in which a pressure vessel has a tubular shell extending upwardly from its upper surface. A rotating vertical shaft extending downwardly through the shell has a plurality of vertically spaced horizontal discs mounted on it. Each disc is smaller than the disc above it. A separate vertical sleeve around each disc other than the uppermost disc extends downwardly to the pressure vessel. Means are provided to deliver water onto the upper surface of the uppermost disc, to control the liquid level within the soaker, and to deliver and maintain air under pressure within the apparatus.

In the drawings, FIG. 1 is an elongated view, partly broken away, of the aeration apparatus of this invention showing part of the internal structure within the shell.

Figure 2:
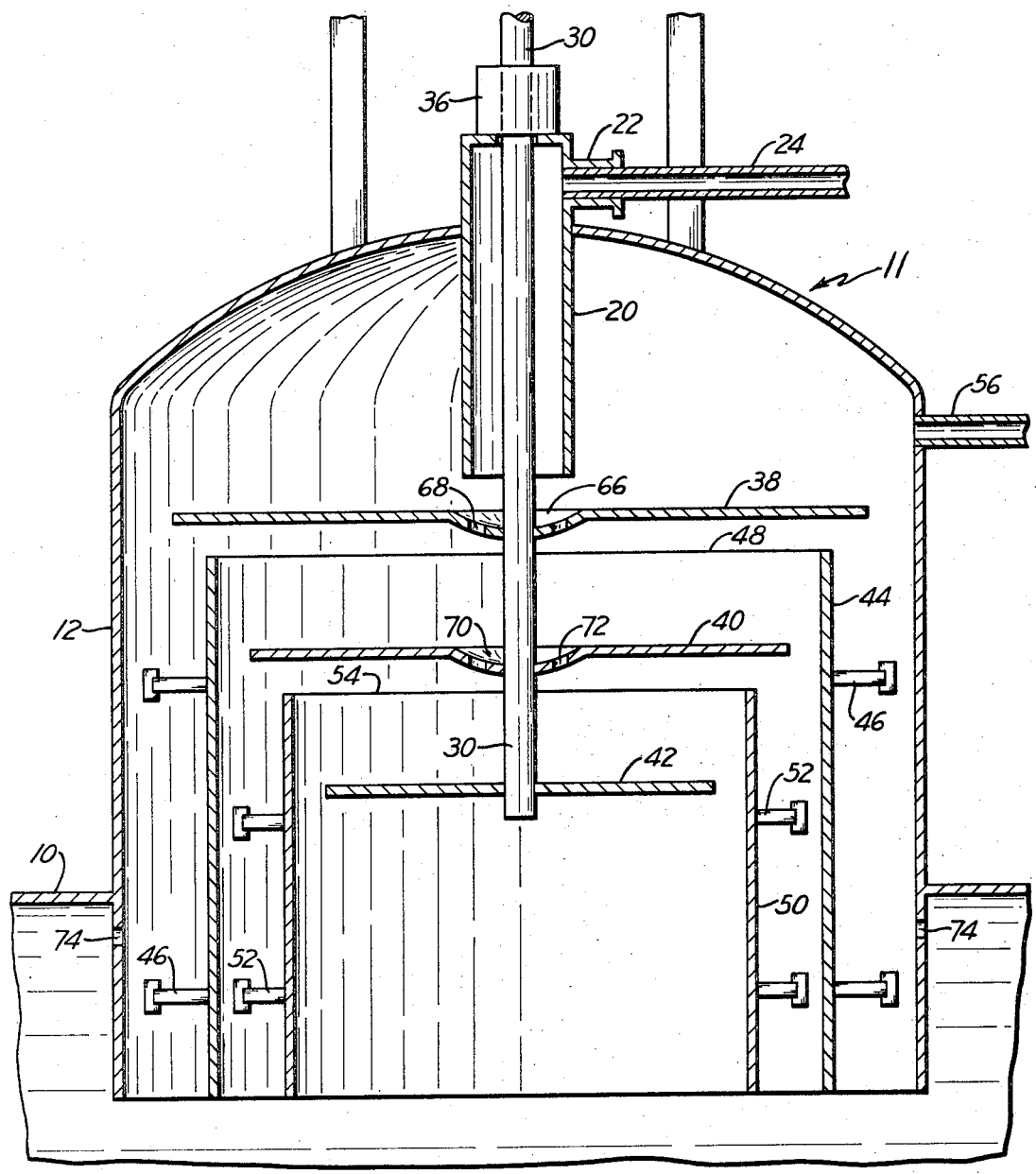

FIG. 2 is a vertical sectional view of the shell.

Referring to FIG. 1 of the drawings, a soaker 10, shown as a horizontal cylindrical pressure vessel, has a contactor, indicated generally by reference numeral 11, extending upwardly from its upper surface. Contactor 11 is a vertical cylindrical shell 12 closed at its upper end by a top 14 and opening at its lower end into the soaker 10. Soaker 10 has an outlet 16 at its lower end connected to a discharge line 18 for the discharge of aerated water. A water distributor 20 extending upwardly through the top 14 of the contactor has an inlet 22 connected to a water feed line 24 for delivery of water to the apparatus. Mounted on a motor stand 26 on top 14 is a motor 28 for rotating a vertical shaft 30 extending downwardly into shell 12. Shaft 30 is supported by conventional means such as a collar 32 on a thrust bearing 34 supported by the motor stand 26. A packing gland 36 mounted on the upper end of distributor 20 provides a seal around the shaft.

Referring to FIG. 2 of the drawings, shaft 30 extends downwardly through distributor 20 into contactor 11. Mounted on the shaft 30 are a plurality of spaced-apart horizontal discs. In the apparatus shown in FIG. 2 there are an upper disc 38, intermediate disc 40, and lower disc 42. This invention is not restricted to apparatus utilizing three discs, but it is desirable to have at least three discs to realize the advantages of a compact structure with a high aeration capacity. The diameter of each disc is less than the diameter of the disc above it. Upper disc 38 has the largest diameter and extends outwardly almost to the wall of the cylindrical shell 12 of soaker 11. Around disc 40 and spaced slightly from the outer edge thereof is a vertical sleeve 44 which is supported in any suitable manner such as by brackets 46 extending from the wall of the shell 12. The upper end 48 of sleeve 44 is slightly below disc 38. Similarly, a vertical sleeve 50 having an internal diameter slightly larger than the diameter of disc 42 is supported by brackets 52 around disc 42. The upper end 54 of sleeve 50 is just below intermediate disc 40.

An air supply line 56 opens into contactor 11 above the level of the upper disc 38. As is best shown in FIG. 1, a control valve 58 in line 56 is actuated by a pressure controller 60 to maintain the desired pressure in the aeration apparatus. A liquid level controller 62 actuates a valve 64 in a liquid discharge line 18 to control the liquid level within the soaker.

In the operation of the apparatus, shaft 30 is rotated at a high velocity by motor 28 and water to be treated is delivered through line 24 into the distributor 20 and onto the upper disc 38. In the apparatus shown, the upper disc 38 has a depression 66 adjacent the shaft 30. A plurality of openings 68 in the disc 38 within the boundaries of the depression 66 allows a part of the water to flow downwardly into the intermediate disc 40. Water not flowing through the openings 68 is discharged in a thin film from the outer edge of the disc and strikes shell 12. Most of the water discharged from the outer edge of disc 38 and striking the inner wall of the shell flows down that wall in a thin film. A part of the liquid may bounce from the shell 12, strike the outer surface of sleeve 44, and flow in a thin film down that surface.

Liquid flowing through the openings 68 drops onto intermediate disc 40. Intermediate disc 40 is also provided with a central depressed portion 70 having a plurality of openings 72 to allow a portion of the water delivered to disc 40 to flow to the lower disc 42. Water delivered to disc 40 and not flowing through openings 72 is discharged from the outer edge of the disc and strikes the inner surface of sleeve 44. Most of that water flows down the inner surface of the sleeve 44 in a thin film but some of the water rebounding from the surface of sleeve 44 strikes the outer surface of sleeve 50 and flows down that surface. Water falling onto rotating disc 42 is discharged from the outer edge of the disc against the inner surface of sleeve 50 and flows down the inner surface of that sleeve in a thin film.

The thin film of water flowing over the surface of the sleeves 50 and 44 and the inner surface of the shell 12 causes efficient contact of water and air over a large area. Because the apparatus is maintained under a high pressure such as 100 psi or higher, the partial pressure of oxygen is high and the rate of absorption of oxygen by the water is greatly increased over the rate than can be obtained at atmospheric pressure.

In the embodiment of the invention illustrated in the drawings, shell 12 and sleeves 44 and 50 extend downwardly into the soaker 10 below the upper wall of the soaker to increase the length of the sleeves and the shell 12 over which contact between water and air is obtained. Ports 74 in the shell below the top of the soaker 10 permit flow of air into the soaker 10 whereby air can be maintained in contact with water in the soaker 10. The arrangement shown provides increased flexibility in control of the area over which contact between the water and air is obtained. The area of contact between the water and air can be selected in the initial design of the equipment by the selection of the length of the contactor. In the embodiment illustrated, further control of the area of contact between the area and water is obtained by controlling the liquid level within the soaker 10. Lowering the liquid level and exposing the lower end of sleeves 50 and 44 and the shell 12 to air increases the effective length of the sleeves in the shell.

Aerated water flows from the lower part of shell 12 and sleeves 44 and 50 into the pressure vessel constituting the soaker. Because of the high pressure maintained in the soaker, oxygen dissolved in the water in the contactor remains dissolved in the water while it is in the soaker. If the water delivered to the apparatus through line 24 has a large BOD, the long time in the soaker allowed by its large volume and the high oxygen concentration made possible by the high pressure, greatly reduces the BOD of the water before it is discharged into the delivery line 18.

The apparatus of this invention provides a compact structure in which intimate contact between air and water can be obtained under an elevated pressure that increases the rate and amount of absorption of oxygen by the water. The arrangement of the plurality of discs of descending diameter with means for delivering water to each of the discs is important in reducing the size of the apparatus required to handle high rates of flow of water. The plurality of parallel surfaces further contributes to the reduction in volume required for the equipment.

I claim:

1. In apparatus for aerating water, the improvement comprising a vertical tubular shell, a vertical shaft extending downwardly through the shell, means for rotating the shaft, a plurality of vertically spaced horizontal discs mounted on the shaft, each disc having a diameter smaller than the diamter of the disc above it, a vertical sleeve surrounding each disc other than the uppermost disc, said sleeve extending upwardly above the disc it surrounds and terminating below the next higher disc, openings in the discs adjacent the shaft to permit flow of water to the next lower disc, means to supply oxygen under pressure into the shell and means to deliver water onto the uppermost disc.

2. Apparatus for aerating water comprising a soaker vessel, an outlet extending from the lower end of the soaker vessel for discharge of aerated water therefrom, a vertical shell opening into the soaker vessel and extending upwardly from the upper surface thereof, a vertical shaft extending downwardly through the shell, means to rotate the shaft, a plurality of vertically spaced horizontal discs mounted on the shaft, openings in at least one of the discs adjacent the shaft for delivery of water to the next lower disc, a vertical sleeve surrounding each of the discs other than the uppermost disc, each of said sleeves extending upwardly above the disc it surrounds and terminating below the next higher disc, water inlet means adapted to discharge water onto the uppermost disc, and means to deliver air into the shell.

3. Apparatus as set forth in claim 2 in which the shell and the sleeves extend downwardly into the soaking vessel below the upper surface thereof, a port in the shell below the upper surface of the soaker vessel, pressure control means for controlling the pressure within the soaker vessel, and liquid level control means for controlling the liquid level in the soaking vessel.

4. Apparatus as set forth in claim 2 in which each of the discs other than the lowest disc has a depression therein adjacent the shaft and the opening through the discs for delivery of water to the next lower disc are in the depressions.

5. Apparatus as set forth in claim 4 in which the area of openings in the discs is less than the area of the openings in the next higher disc.

* * * * *